(12) United States Patent
Isawa

(10) Patent No.: US 10,508,706 B2
(45) Date of Patent: Dec. 17, 2019

(54) STOPPER AND ANTIVIBRATION UNIT

(71) Applicant: TOYO TIRE & RUBBER CO., LTD., Itami-shi, Hyogo (JP)

(72) Inventor: Gen Isawa, Itami (JP)

(73) Assignee: TOYO TIRE CORPORATION, Itami-shi (JP)

(*) Notice: Subject to any disclaimer, the term of this patent is extended or adjusted under 35 U.S.C. 154(b) by 0 days.

(21) Appl. No.: 15/943,972

(22) Filed: Apr. 3, 2018

(65) Prior Publication Data

US 2018/0298977 A1 Oct. 18, 2018

(30) Foreign Application Priority Data

Apr. 13, 2017 (JP) ................................. 2017-079680

(51) Int. Cl.

| | |
|---|---|
| F16F 5/00 | (2006.01) |
| F16F 13/10 | (2006.01) |
| B60K 5/12 | (2006.01) |
| F16F 1/38 | (2006.01) |
| F16F 1/387 | (2006.01) |
| F16F 1/376 | (2006.01) |
| F16F 1/373 | (2006.01) |

(52) U.S. Cl.
CPC .............. *F16F 13/101* (2013.01); *B60K 5/12* (2013.01); *B60K 5/1291* (2013.01); *F16F 1/376* (2013.01); *F16F 1/3828* (2013.01); *F16F 1/3849* (2013.01); *F16F 1/3873* (2013.01); *F16F 1/3735* (2013.01)

(58) Field of Classification Search
CPC ..... F16F 1/36; F16F 1/38; F16F 1/101; B60K 5/12

USPC ......... 267/140.11–140.13, 140.2–140.5, 141, 267/141.1–141.7, 279–283, 292–294
See application file for complete search history.

(56) References Cited

U.S. PATENT DOCUMENTS

| | | | | |
|---|---|---|---|---|
| 3,235,207 A | * | 2/1966 | Edward | .................... H02K 5/24 248/606 |
| 3,955,808 A | * | 5/1976 | Jorn | ...................... B60G 15/08 267/152 |

(Continued)

FOREIGN PATENT DOCUMENTS

JP 2013-170628 A 9/2013

OTHER PUBLICATIONS

Office Action dated Aug. 2, 2019, issued in counterpart CN Application No. 201810131639.1, with English translatin (9 pages).

*Primary Examiner* — Christopher P Schwartz
(74) *Attorney, Agent, or Firm* — Westerman, Hattori, Daniels & Adrian, LLP; Stephen B. Parker

(57) ABSTRACT

A stopper includes: a mounting hole into which an inside member is inserted; and a plurality of surface ribs and a plurality of rear surface ribs. A plurality of surface ribs respectively protrude from the surface and linearly disposed. A plurality of the rear surface ribs, on a rear surface, respectively protrude from between the surface ribs and linearly disposed. In a predetermined region in a circumferential direction of the mounting hole, intervals between the surface ribs adjacent to each other and intervals between the rear surface ribs adjacent to each other are set to be constant throughout an entire length in an extending direction in which the surface ribs and the rear surface ribs extend.

10 Claims, 8 Drawing Sheets

(56) References Cited

U.S. PATENT DOCUMENTS

| | | | | | |
|---|---|---|---|---|---|
| 4,711,206 | A | * | 12/1987 | Andra | F16F 13/22 248/636 |
| 4,742,999 | A | * | 5/1988 | Flower | F16F 13/106 188/320 |
| 4,974,818 | A | * | 12/1990 | Kato | F16F 13/108 267/140.13 |
| 5,782,461 | A | * | 7/1998 | Gwinn | F16F 1/445 267/140 |
| 6,722,481 | B2 | * | 4/2004 | Maeno | F16F 7/108 188/378 |
| 6,910,683 | B2 | * | 6/2005 | Itoh | F16F 13/106 267/140.13 |
| 8,490,954 | B2 | * | 7/2013 | Saito | F16F 13/106 267/140.13 |
| 8,794,606 | B2 | * | 8/2014 | Kubo | F16F 13/106 267/140.13 |
| 2010/0072683 | A1 | * | 3/2010 | Saito | F16F 13/106 267/140.13 |
| 2012/0074629 | A1 | * | 3/2012 | Yamamoto | F16F 13/106 267/140.13 |
| 2014/0103586 | A1 | * | 4/2014 | Tsutsunni | F16F 13/106 267/140.13 |

* cited by examiner

STOPPER AND ANTIVIBRATION UNIT

TECHNICAL FIELD

The present invention relates to a stopper and an antivibration unit for regulating the relative movement between an inside member and an outside member of an antivibration device.

BACKGROUND ART

Conventionally, an antivibration device is known. In the antivibration device, an axial inside member has an axial end portion fixed to a first bracket, a cylindrical outside member is disposed on an external peripheral side of the inside member and is fixed to a second bracket, and an antivibration base body including a rubber-like elastic body connects the inside member with the outside member. Among such antivibration devices, some has a structure in which a stopper is mounted to the antivibration device. With this structure, when a load is inputted from the first bracket or the second bracket, the stopper regulates an axial movement of the outer member relative to the inner member (Patent Literature 1).

Patent Literature 1 describes that, between the first bracket, and the second bracket and outside member, the plate-like stopper including a rubber-like elastic body is disposed and that a plurality of ribs protruding respectively from the surface and rear surface of the stopper are disposed in an alternate manner on the surface and rear surface.

CITATION LIST

Patent Literature

[Patent Literature 1] JP-A No. 2013-170628

SUMMARY OF INVENTION

Technical Problem

According to Patent Literature 1, however, a plurality of ribs are radially provided. Due to this, when the same stopper is diverted to an outside member having a different internal diameter or a different external diameter or to a first bracket and a second bracket each having a different configuration will change the intervals of the ribs for contact with the outside member, the first bracket and the second bracket. This causes a problem that a reactive force of the stopper against a deformation amount of the stopper may change, thus changing the characteristic of the stopper.

For addressing the above problem, the present invention has been made. It is, therefore, an object of the present invention to provide a stopper and an antivibration unit which are capable of suppressing the characteristic change of the stopper at the time of being diverted.

Solution to Problem

For accomplishing this purpose, a stopper under the present invention is in a form of a plate and mounted to an antivibration device which includes an axial inside member having an axial end portion fixed to a first bracket, a cylindrical outside member disposed on an external peripheral side of the inside member and having an external peripheral face fixed to a second bracket, and an antivibration base body connected to the external peripheral face of the inside member and to an internal peripheral face of the outside member and including a rubber-like elastic body, the stopper being adapted to regulate a movement of the outside member relative to the inside member and including a rubber-like elastic body, the stopper including: a mounting hole passing through from a surface to a rear surface and into which the inside member is inserted; and a plurality of surface ribs and a plurality of rear surface ribs disposed between the first bracket and at least one of the second bracket or the outside member, wherein the plurality of the surface ribs respectively protrude from the surface and are linearly disposed, the plurality of the rear surface ribs, on the rear surface, respectively protrude from between the surface ribs and are linearly disposed, and in a predetermined region in a circumferential direction of the mounting hole, intervals between the surface ribs adjacent to each other and intervals between the rear surface ribs adjacent to each other are set to be constant throughout an entire length in an extending direction in which the surface ribs and the rear surface ribs extend.

Advantageous Effects of Invention

With the stopper according to a first aspect, in a predetermined region in a circumferential direction of the mounting hole, intervals between the surface ribs adjacent to each other and intervals between the rear surface ribs adjacent to each other are set to be constant respectively throughout an entire length in an extending direction in which the surface ribs and the rear surface ribs extend. Thus, even diverting the same stopper to an outside member, a first bracket and a second bracket each having a different dimension or a different configuration can prevent, in the predetermined region, any change of intervals of surface ribs and any change of intervals of rear surface ribs. Hereinabove, the surface ribs and the rear surface ribs have contact with the first bracket, the second bracket and the outside member. Thus, a reactive force of the stopper against the relative movement amount between the inside member and the outside member can be suppressed from being changed attributable to the change in the intervals of the surface ribs and the intervals of the rear surface ribs. As a result thereof, the change of the characteristic of the stopper at the time of being diverted can be suppressed, which is effective.

With the stopper according to a second aspect, in the predetermined region in the circumferential direction of the mounting hole, all of each of the intervals between the surface ribs adjacent to each other and each of the intervals between the rear surface ribs adjacent to each other are set to be the same. In the predetermined region, this can uniformly deform the stopper between the surface ribs and between the rear surface ribs. In addition to the effect according to the first aspect, this can bring about an effect of further suppressing the characteristic change of the stopper at the time of being diverted and another effect of improving the endurance of the stopper.

With the stopper according to a third aspect, at least one of the plurality of the surface ribs and the plurality of the rear surface ribs are continuously provided linearly throughout the entire length in the extending direction respectively. In addition to the effect of the first aspect, this can make it easy to form the surface ribs and rear surface ribs which are linearly continuous.

With the stopper according to a fourth aspect, at least one of the plurality of the surface ribs and the plurality of the rear surface ribs are intermittently provided linearly throughout the entire length in the extending direction respectively. In addition to the effect of a first aspect, this can make it easier to elastically deform the surface ribs and the rear surface ribs which are linearly intermittent, compared with the case in which the surface ribs and the rear surface ribs are linearly continuous.

With the stopper according to a fifth aspect, the plurality of the surface ribs and the plurality of the rear surface ribs are curvedly provided throughout the entire length in the extending direction respectively. In addition to the effect of the first aspect, this can secure an area of the surface rib and an area of the rear surface rib for contact with the first bracket and the second bracket, provided that a partial configuration of each of the first bracket and the second bracket is curved.

With the antivibration unit according to a sixth aspect, the stopper according to the first aspect is mounted to an antivibration device adapted to connect a first bracket with a second bracket. In a non-load state of the antivibration device, the plurality of the surface ribs and the plurality of the rear surface ribs are free from a contact with the first bracket and with the second bracket and the outside member. This accomplishes that, at the time of regulating, with the stopper, the relative movement between the inside member and the outside member, the stopper, in a stepwise manner, contacts the first bracket, the second bracket and the outside member. In a stepwise manner, this can increase the reactive force of the stopper against the relative movement amount between the inside member and the outside member. In addition to the effect of the first aspect, this can suppress any vibration or abnormal noise from being caused by a rapid increase of the reactive force of the stopper.

DESCRIPTION OF EMBODIMENTS

Figure 1A:
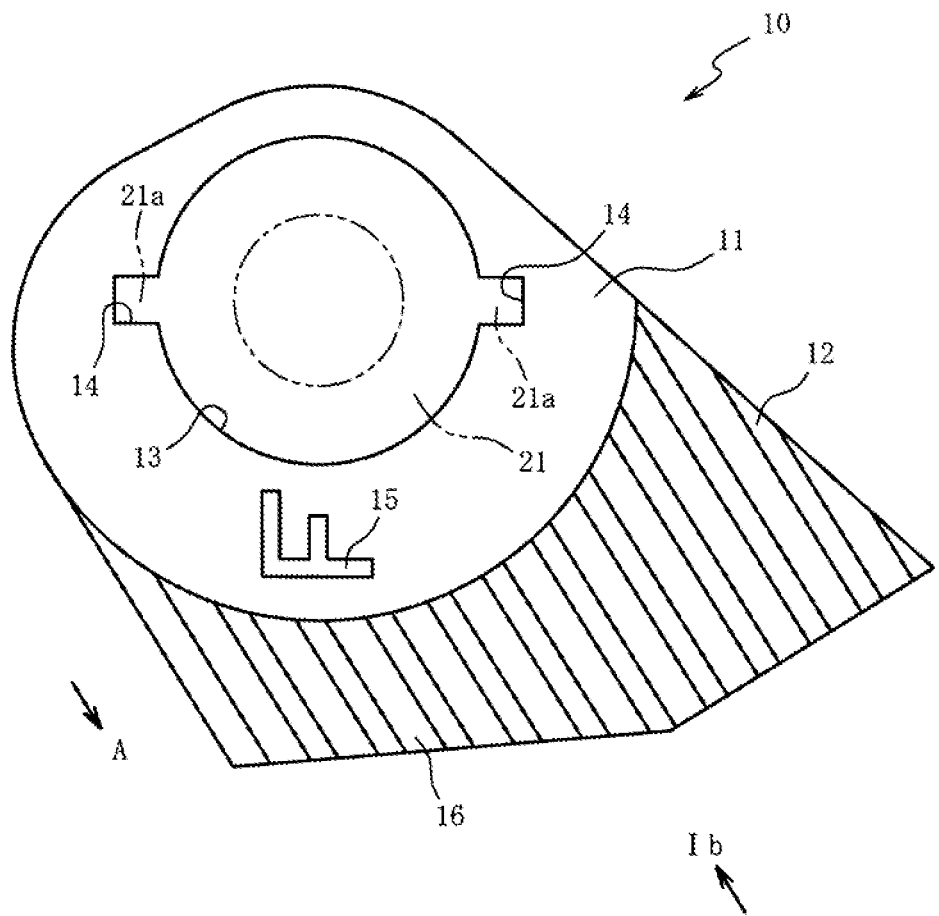
FIG. 1A is a plan view of a stopper, according to a first embodiment of the present invention.
Figure 1B:
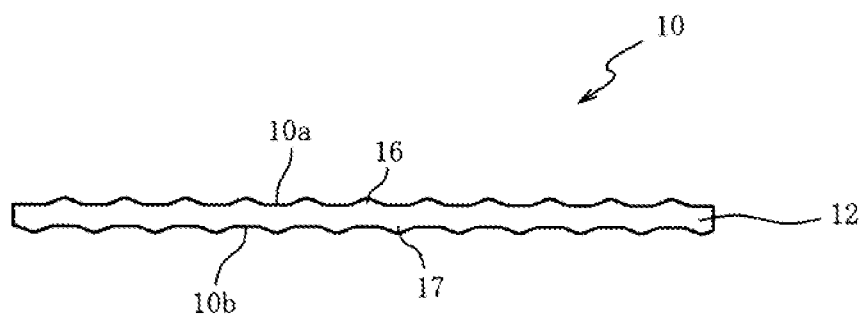
FIG. 1B is a side view of the stopper, viewed from the direction of an arrow mark Ib in FIG. 1A.

Hereinafter, preferable embodiments of the present invention will be described, referring to attached drawings. First, referring to FIG. 1A and FIG. 1B, a description will be made about a stopper 10 according to a first embodiment of the present invention. FIG. 1A is a plan view of the stopper 10. FIG. 1B is a side view of the stopper 10 viewed from the direction of an arrow mark Ib in FIG. 1A. Further, with a two-dot chain line, FIG. 1A shows an inside member 21 to which the stopper 10 is mounted.

Figure 2:
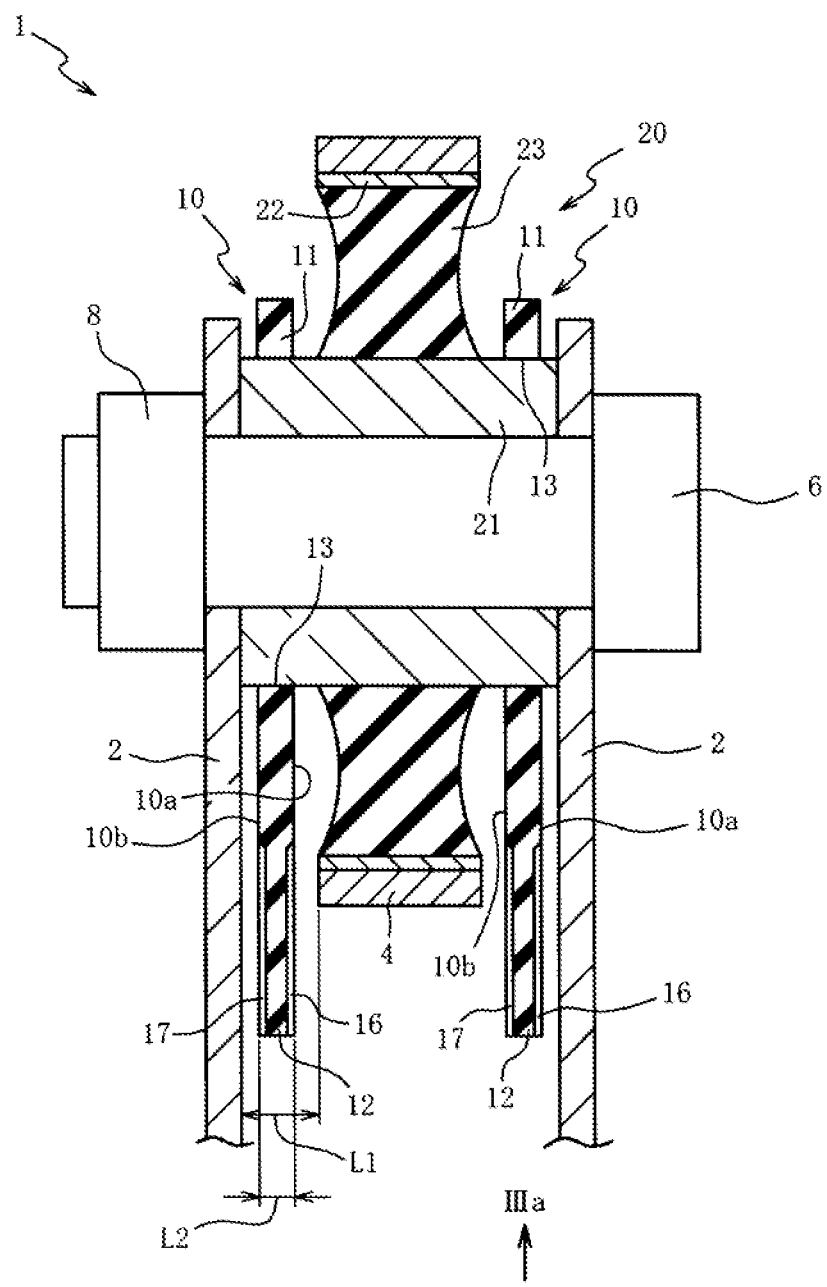
FIG. 2 is a cross sectional view of an antivibration unit.

As shown in FIG. 1A and FIG. 1B, the stopper 10 is a plate-like member for regulating an axial movement of an outside member 22 (refer to FIG. 2) relative to the inside member 21 of an antivibration device 20 (refer to FIG. 2). The stopper 10 includes a rubber-like elastic body. The stopper 10 has a surface 10a and a rear surface 10b which are formed in a substantially symmetrical manner. The stopper 10 includes an annular mounting portion 11 and a regulating portion 12. The regulating portion 12 is continuous with the mounting portion 11.

The mounting portion 11 is an annular region having, in its center, a substantially circular mounting hole 13 passing through from the surface 10a to the rear surface 10b. The internal diameter of the mounting hole 13 is set to be slightly smaller than the external diameter of the cylindrical inside member 21. By this, inserting the inside member 21 into the mounting hole 13 fits the inside member 21 with the mounting hole 13, to thereby mount the mounting portion 11 to the inside member 21.

The mounting portion 11 is provided with a plurality of dent portions 14. The dent portions 14 dent radially outward from the internal peripheral face of the mounting hole 13. A protruding portion 21a protruding radially outward from the inside member 21 is consistent with the dent portion 14. This can specify the direction and position of the mounting portion 11 relative to the inside member 21.

The mounting portion 11 is formed with a mark 15 for specifying the surface 10a and rear surface 10b of the stopper 10. The surface 10a of the mounting portion 11 is formed with a character "F" in a protruding manner. The character "F" is the mark 15 showing the surface 10a. Further, though not shown, the rear surface 10b of the mounting portion 11 is formed with a protruding character "R". The character "R" is the mark 15 showing the rear surface 10b. Further, the mark 15 is not limited to the case of being formed with the protruding character, while a dented character is also allowed. Further, any figure, etc. may be formed in a protruding or dented manner.

In plan view, the stopper 10 is asymmetrically formed on both sides of any of straight lines radially extending through the center of the mounting hole 13. Thus, mounting the stopper 10 to the inside member 21 with the surface and rear surface of the stopper 10 upside down may lead to a possibility of failing to bring about a sufficient effect by the stopper 10. Contrary to this, according to the first embodiment, specifying, with the mark 15, the surface 10a and rear surface 10b of the stopper 10 can easily mount the stopper 10 to the inside member 21 in a proper direction. As a result thereof, the proper mounting of the surface and rear surface of the stopper 10 can bring about a sufficient effect by the stopper 10.

The regulating portion 12 is a plate-like region provided in a manner to extend, in an extending direction A, from a part of the annular mounting portion 11. The extending direction A is a radial direction. The regulating portion 12 includes a plurality of surface ribs 16 and a plurality of rear surface ribs 17. The surface rib 16 protrudes from the surface 10a. The rear surface rib 17 protrudes from the rear surface 10b.

The surface rib 16 and the rear surface rib 17 are each a region disposed linearly toward the extending direction A. The surface rib 16 and the rear surface rib 17 each are continuous throughout an entire length thereof. Being linearly continuous, the surface rib 16 and the rear surface rib 17 can be formed with ease. In side view (in FIG. 1B), the surface rib 16 and the rear surface rib 17, each in a form of a triangle, protrude from the surface 10a and the rear surface 10b. The surface of each of the surface rib 16 and the rear surface rib 17 is formed with a smooth cross sectional curve.

A plurality of rear surface ribs 17 are disposed between a plurality of surface ribs 16. For more details, between apexes (points most away from the surface 10a) of the plurality of surface ribs 16, apexes of the plurality of ribs 17 are disposed. In this way, with the surface 10a and the rear surface 10b of the stopper 10, the surface ribs 16 and the rear surface ribs 17 are alternately disposed.

The plurality of surface ribs 16 and the plurality of rear surface ribs 17 are disposed in parallel with each other. That is, the intervals of the surface ribs 16 adjacent to each other, the intervals of the rear surface ribs 17 adjacent to each other are respectively set to be constant throughout the entire length of the regulating portion 12 in the extending direction A. Further, each interval of the adjacent surface ribs 16 and each interval of the adjacent rear surface ribs 17 are all set to be the same.

The width (dimension in right and left directions on the paper plane of FIG. 1B) of the surface rib 16 and the width of the rear surface rib 17 are all set to be the same. The height of the surface rib 16 (a protrusion amount from the surface 10a) and the height of the rear surface rib 17 (a protrusion amount from the rear surface 10b) are all set to be the same.

Then, referring to FIG. 2, a description will be made about an antivibration unit 1 in which the stopper 10 is mounted to the antivibration device 20. FIG. 2 is a cross sectional view of the antivibration unit 1. As shown in FIG. 2, the antivibration unit 1 includes a first bracket 2, a second bracket 4, the antivibration device 20 and the stopper 10. The first bracket 2 is mounted to a vibrational source side (not shown) such as an engine. The second bracket 4 is mounted to a vibrational receiving side (not shown) such as a vehicle body. The antivibration device 20 connects the first bracket 2 with the second bracket 4. The stopper 10 is mounted to the antivibration device 20. The antivibration device 20 is a bush. While suppressing a vibrational transmission between the first bracket 2 and the second bracket 4, the antivibration device 20 connects the first bracket 2 with the second bracket 4. Further, mounting the first bracket 2 on the vibrational receiving side while mounting the second bracket 4 on the vibrational source side is allowed.

The antivibration device 20 includes the cylindrical inside member 21, the cylindrical outside member 22, and an antivibration base body 23. On the external peripheral side of the inside member 21, the outside member 22 is disposed coaxially with the inside member 21 at a distance. The antivibration base body 23 connects the inside member 21 with the outside member 22 and includes a rubber-like elastic body. The inside member 21 is a member including a rigid material such as an iron-and-steel material, an aluminum alloy, etc.

The inside member 21 is axially sandwiched by a pair of first brackets 2. In this state, a bolt 6 is inserted into an internal peripheral side of the inside member 21 and into a through hole of the first bracket 2, to thereby fasten the nut 8 to the bolt 6. This fastening fixes the axial end portion of the inside member 21 to the first bracket 2. Further, not limited to the case of mounting the inside member 21 to the first bracket 2 by using the bolt 6 and the nut 8, the inside member 21 may be mounted to the first bracket 2 by using an axial member such as rivet, etc.

The outside member 22 is a member including a rigid material such as an iron-and-steel material, aluminum alloy, etc. The axial dimension of the outside member 22 is set to be smaller than the axial dimension of the inside member 21. Being press-fitted into the cylindrical second bracket 4, the outside member 22 is fixed. The axial dimension of the second bracket 4 and the axial dimension of the outside member 22 are set to be the same. With the outside member 22 press-fitted into the second bracket 4, the above same setting allows the axial end portion of the second bracket 4 to be consistent with the axial end portion of the outside member 22.

The antivibration base body 23 is a substantially cylindrical member which is adhered, in a vulcanized manner, to the external peripheral face of the inside member 21 and to the internal peripheral face of the outside member 22. Using the antivibration base body 23, the antivibration device 20 connects the inside member 21 with the outside member 22. When a load caused by the axial vibration of each of the inside member 21 and the outside member 22 is inputted from the first bracket 2 and the second bracket 4, the outside member 22 axially moves relative to the inside member 21. Further, unless specifically designated in this specification, a description will be made about a case in which the axial load is applied to the antivibration device 20 and the outside member 22 axially moves relative to the inside member 21.

The stopper 10 regulates the movement of the outside member 22 relative to the inside member 21. Further, the stopper 10 buffers a collision caused by the relative movement, i.e., a collision of the first bracket 2 with the outside member 22 or another collision of the first bracket 2 with the second bracket 4. For the regulating and buffering operations, the stopper 10 is disposed between the first bracket 2 and a combination including the outside member 22 and the second bracket 4. Further, for using the stopper 10, first, the outside member 22 is put in a state of being pressed into the second bracket 4. In this state, the inside member 21 is inserted into the mounting hole 13 of the mounting portion 11, to thereby mount the stopper 10 to the inside member 21. Then, the inside member 21 is mounted to the first bracket 2. Thereby, the regulating portion 12 (surface rib 16 and rear surface rib 17) of the stopper 10 is disposed between the first bracket 2 and the combination including the outside member 22 and the second bracket 4.

Figure 3A:
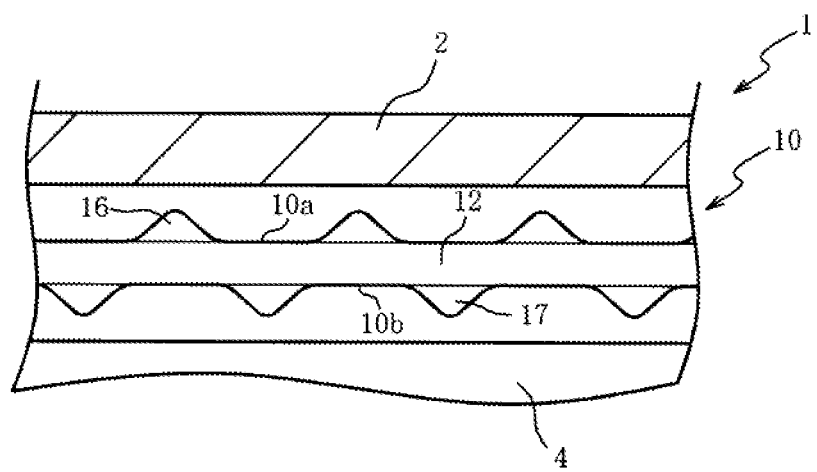
FIG. 3A is a schematic side view of the antivibration unit, viewed from the direction of the arrow mark IIIa in FIG. 2.
Figure 3B:
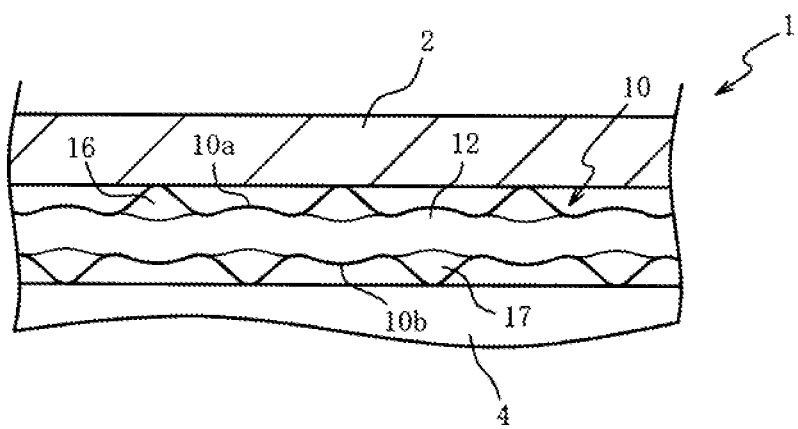
FIG. 3B is an explanatory drawing showing the stopper elastically deformed at the time of inputting of a load which is relatively small.
Figure 3C:
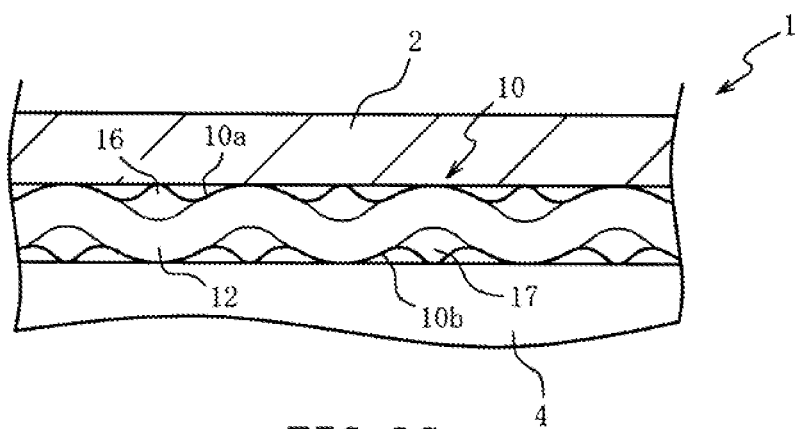
FIG. 3C is an explanatory drawing showing the stopper elastically deformed at the time of inputting of a load which is relatively large.
Figure 4:
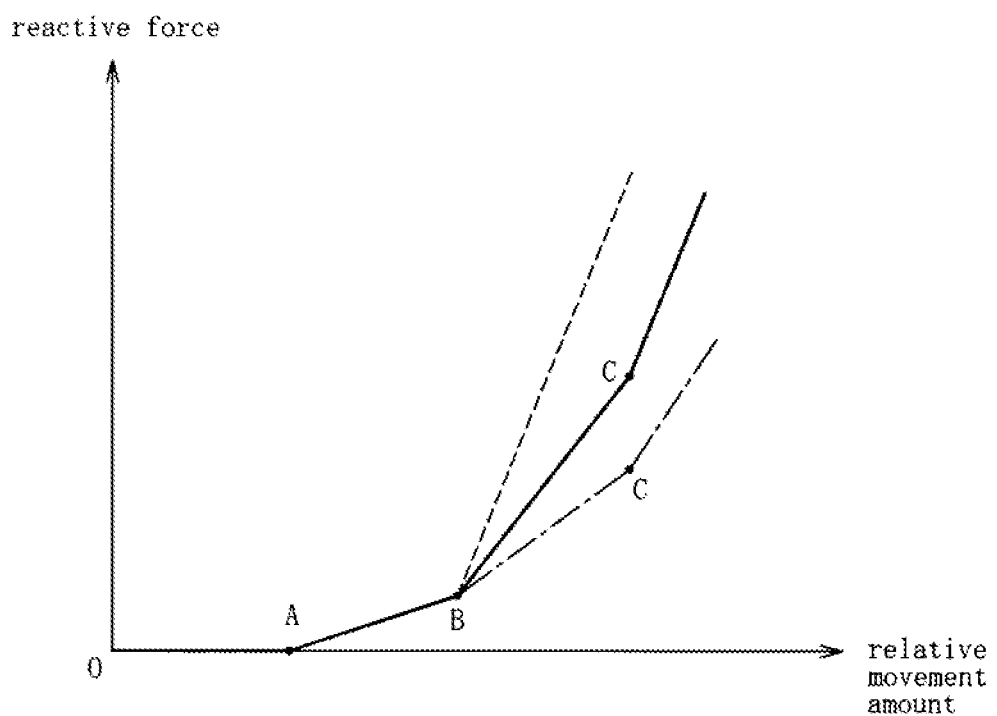
FIG. 4 is a graph showing a reactive force of the stopper against a relative movement amount between an inside member and an outside member.

Then, in addition to FIG. 2, referring to FIG. 3A to FIG. 4, a description will be made about a behavior of the stopper 10 at the time of inputting of the load. FIG. 3A is a schematic side view of the stopper 10 and antivibration device 20, viewed from the direction of the arrow mark IIIa in FIG. 2. FIG. 3B is an explanatory drawing showing the stopper 10 deformed at the time of inputting of the load which is relatively small. FIG. 3C is an explanatory drawing showing the stopper 10 deformed at the time of inputting of the load which is relatively large. FIG. 4 is a graph showing a reactive force of the stopper 10 against a relative movement amount between the inside member 21 and the outside member 22.

The graph in FIG. 4 has an abscissa showing a relative movement amount between the inside member 21 and the outside member 22 and an ordinate showing the reactive force of the stopper 10. The relative movement amount and the reactive force each get larger toward the directions indicated by the arrows of the abscissa and the ordinate respectively. Further, the reactive force of the stopper 10 against the relative movement amount curvedly increases. For ease of understanding, however, the increase is linearly shown in FIG. 4.

As shown in FIG. 2 and FIG. 3A, with the antivibration device 20 in a non-load state, the inside member 21 protrudes from the outside member 22 by a predetermined amount on both axial sides. That is, an interval L1 is provided between the first bracket 2 and the second bracket 4 and between the first bracket 2 and the outside member 22.

Meanwhile, a thickness L2 of the stopper 10 is smaller than the interval L1. Thus, in the non-load state of the antivibration device 20, the stopper 10 is free from a contact with at least one of the first bracket 2 and the combination including the second bracket 4 and the outside member 22. According to the first embodiment, the stopper 10 is free from a contact with any of the first bracket 2 and the combination including the second bracket 4 and the outside member 22. Further, with the antivibration device 20 in the non-load state, the stopper 10 can be free from a contact with at least one of the first bracket 2 and the combination including the second bracket 4 and the outside member 22, as a matter of course. Still further, with the antivibration device 20 in the non-load state, the stopper 10 can be in contact with the first bracket 2 and the combination including the second bracket 4 and the outside member 22, as a matter of course.

With the antivibration device 20 in the non-load state, when the combination including the second bracket 4 and the outside member 22 is free from a contact with the stopper 10, the stopper 10 is prevented from regulating the movement of the inside member 21 relative to the outside member 22 until a predetermined load is inputted. That is, from an original point O to a point A in FIG. 4, the stopper 10 is free from causing a reactive force. Thus, a reactive force accompanying an elastic deformation of the antivibration base body 23 is given to the second bracket 4 and the outside member 22 which move relative to the inside member 21.

With the antivibration device 20 in the non-load state, when the first bracket 2 is free from a contact with the stopper 10, applying a load to the stopper 10 from the second bracket 4 and the outside member 22 will cause the stopper 10 to be elastically deformed toward the first bracket 2 side. That is, at and beyond the point A in FIG. 4, in addition to the reactive force accompanying the elastic deformation of the antivibration base body 23, a reactive force accompanying the elastic deformation of the stopper 10 is applied to the second bracket 4 and the outside member 22 which move relative to the inside member 21.

As shown in FIG. 3B, the inputted load causes the first bracket 2 and the second bracket 4 (and the outside member 22) to contact the regulating portion 12. Then, the regulating portion 12 is sandwiched by the first bracket 2 and the second bracket 4. Then, the stopper 10 including the rubber-like elastic body is compressed, to thereby cause an elastic deformation. Further, the surface 10a and the rear surface 10b of the regulating portion 12 respectively are provided with the surface rib 16 and the rear surface rib 17. This providing can suppress any abnormal noise attributable to the contact of the regulating portion 12 with the first bracket 2, the second bracket 4 and the outside member 22.

Herein, when the rear surface rib 17 is present while the surface rib 16 is absent, the surface 10a has a face contact with the first bracket 2, to thereby deform the regulating portion 12 in a compressive manner in the position of the rear surface rib 17 mainly. Thus, a relatively large reactive force accompanying the compressive deformation of the regulating portion 12 is applied to the second bracket 4 (and the outside member 22) moving relative to the first bracket 2 (and the inside member 21).

Further, a compressed deformation amount of the regulating portion 12 is large in the position where the rear surface rib 17 is present while small in the position where the rear surface rib 17 is absent. The difference in this deformation amount causes a partial strain to the regulating portion 12, thus making it easy to lower the endurance.

Further, when the surface rib 16 is present while the rear surface rib 17 is absent, likewise, the regulating portion 12 is deformed in a compressive manner in the position of the surface rib 16 mainly. Then, a relatively large reactive force accompanying the compressive deformation of the regulating portion 12 is applied to the second bracket 4. Further, the difference in deformation amount between the position with the surface rib 16 and the position without the surface rib 16 causes a partial strain to the regulating portion 12, thus making it easy to lower the endurance.

Further, when the surface 10a and the rear surface 10b have, in the same positions (symmetrical positions), the surface rib 16 and the rear surface rib 17, likewise, the regulating portion 12 is deformed in a compressive manner in positions of the surface rib 16 and rear surface rib 17 mainly. Thus, a relatively large reactive force accompanying the compressive deformation of the regulating portion 12 is applied to the second bracket 4. In FIG. 4, the broken line shows a relation between the relative movement amount and the reactive force, in a first case in which the surface rib 16 is absent, a second case in which the rear surface rib 17 is absent and a third case in which the surface rib 16 and the rear surface rib 17 are in the same positions on the surface 10a and the rear surface 10b. At a point B and beyond, the regulating portion 12 is sandwiched by the first bracket 2 and the second bracket 4. In the above first, second and third cases, at and beyond the point B, the reactive force against the relative movement amount shows a rapid increase.

Contrary to these, the surface rib 16 and rear surface rib 17 are disposed in an alternate manner on the surface 10a and rear surface 10b of the regulating portion 12, according to the first embodiment. This causes the regulating portion 12 to elastically deform in a corrugated manner. This can suppress the difference in deformation amount in each position of the regulating portion 12, thus making it possible to improve the endurance of the regulating portion 12. Further, until the rear surface 10b opposite to the surface rib 16 and the surface 10a opposite to the rear surface rib 17 respectively have contacts with the first bracket 2 and the second bracket 4, i.e., from the point B to a point C in FIG. 4, the reactive force, which accompanies the elastic deformation of the regulating portion 12, against the relative movement amount between the inside member 21 and the outside member 22 can be suppressed.

As shown in FIG. 3C, when the rear surface 10b opposite to the surface rib 16 and the surface 10a opposite to the rear surface rib 17 respectively have contacts with the first bracket 2 and the second bracket 4, the reactive force, which accompanies the elastic deformation of the regulating portion 12, against the relative movement amount between the inside member 21 and the outside member 22 can be enlarged. At and beyond the point C in FIG. 4, the surface 10a and the rear surface 10b respectively contact the first bracket 2 and the second bracket 4. At and beyond the point C, compared with before the point C, the rate of increasing the reactive force can be made large.

As stated above, the surface 10a and the rear surface 10b have the surface rib 16 and the rear surface rib 17 disposed in an alternate manner. At and beyond the point B where the regulating portion 12 is sandwiched by the first bracket 2 and the second bracket 4, compared with the case shown with the broken line in FIG. 4, this alternate disposing works to enlarge, in a stepwise manner, the reactive force of the stopper 10 against the relative movement amount between the inside member 21 and the outside member 22. Further, this alternate disposing can suppress the reactive force in the initial step.

Further, rendering the first bracket 2 free from a contact with the stopper 10 can cause, at and beyond the point A, the reactive force of the stopper 10. This can, before and after the point A, increase, in a stepwise manner, the reactive force for suppressing the relative movement amount between the inside member 21 and the outside member 22. Further, rendering the second bracket 4 and outside member 22 free from a contact with the stopper 10 can, before and after the point B, increase, in a stepwise manner, the reactive force of the stopper 10 against the relative movement amount. In these ways, increasing, in a stepwise manner, the reactive force against the relative movement amount can suppress any vibration or abnormal noise attributable to a rapid increase of the reactive force.

Figure 5A:
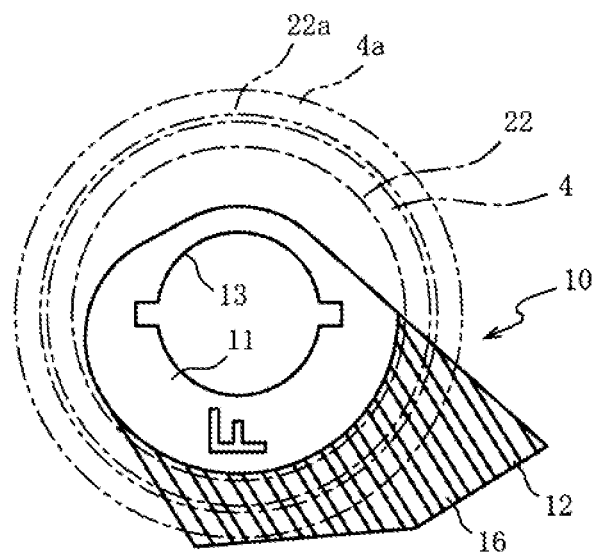
FIG. 5A is an explanatory drawing for showing a relation relative to the ribs of the stopper in the case in which the stopper is diverted to the second bracket and the outside member each having a different diameter.
Figure 5B:
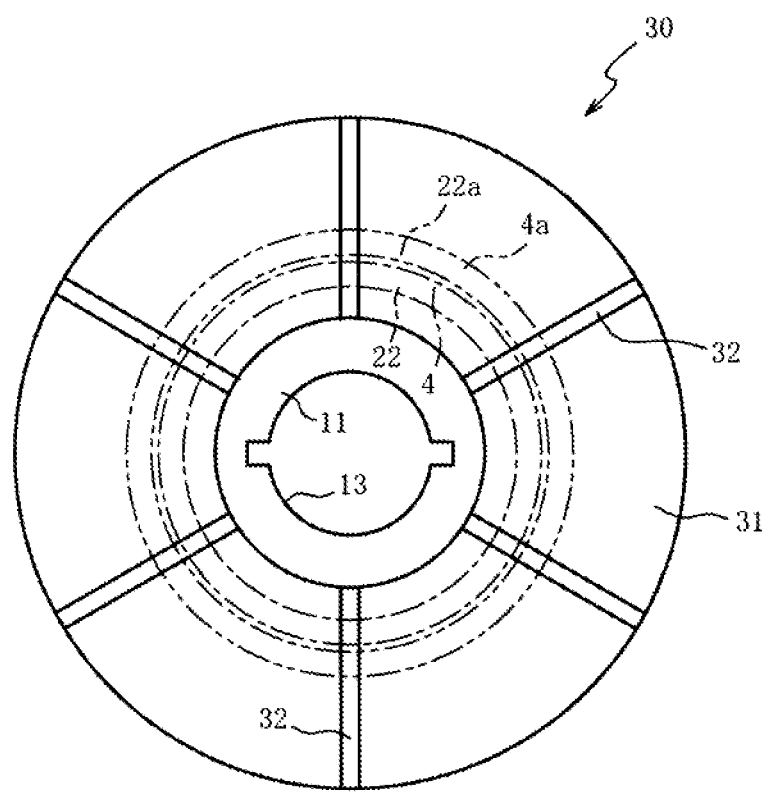
FIG. 5B is an explanatory drawing for showing a relation relative to the ribs of a stopper in the case in which the stopper is diverted to the second bracket and the outside member each having a different diameter, according to a first comparative example.

Then, referring to FIG. 5A and FIG. 5B, a description will be made about a behavior of the stopper 10 when the same stopper 10 is diverted to the second bracket and the outside member each having a different external diameter and a different internal diameter. FIG. 5A is an explanatory drawing for showing a relation relative to the stopper 10 in the case in which the stopper 10 is diverted to the second bracket 4 and the outside member 22 each having a different external diameter and a different internal diameter. FIG. 5B is an explanatory drawing for showing a relation relative to a stopper 30 in the case in which the stopper 30 is diverted to the second bracket 4 and the outside member 22 each having a different external diameter and a different internal diameter, according to a first comparative example. Herein, according to the first comparative example, the configuration of a regulating portion 31 of the stopper 30 is changed, and other structures are the same as those according to the first embodiment.

In FIG. 5A and FIG. 5B, the one-dot chain line shows the second bracket 4 and outside member 22 described above. Further, in FIG. 5A and FIG. 5B, the two-dot chain line shows a second bracket 4a and an outside member 22a different in internal diameter and external diameter from the second bracket 4 and the outside member 22. FIG. 5A and FIG. 5B show the external periphery of each of the second brackets 4, 4a and the internal periphery of each of the outside members 22, 22a, while not showing any boundaries therebetween.

As shown in FIG. 5A, the same stopper 10 is diverted to the second bracket 4a and the outside member 22a larger in internal diameter and external diameter than the second bracket 4 and the outside member 22. Radially outwardly with respect to the mounting portion 11, this diverting of the same stopper 10 moves the position for contact with the surface rib 16. The intervals of the adjacent surface ribs 16 are respectively set to be constant throughout the entire length of the regulating portion 12 in the extending direction A. Thus, this setting prevents any change in the intervals of the surface ribs 16 in the portion for contact with the second brackets 4, 4a and the outside members 22, 22a.

Further, when the stopper 10 is diverted to a second bracket and an outside member smaller in internal diameter and external diameter than the second bracket 4 and the outside member 22, likewise, the intervals of the surface ribs 16 in the portion for contact with the second bracket and the outside member remain unchanged. Further, the intervals of the adjacent rear surface ribs 17 are respectively set to be constant throughout the entire length of the regulating portion 12 in the extending direction A. Thus, even diverting the stopper 10 to the second bracket 4 and the outside member 22 each having a different external diameter and a different internal diameter prevents any change in the intervals of the rear surface ribs 17 in the portion for contact with the second bracket 4 and the outside member 22.

Meanwhile, as shown in FIG. 5B, the stopper 30 according to the first comparative example has the regulating portion 31 protruding from the entire circumference of the annular mounting portion 11. A plurality of ribs 32 protrude from a surface and a rear surface of the regulating portion 31, and thereby a plurality of ribs 32 are disposed in a form of a radiation around the mounting portion 11. Thus, intervals between the ribs 32 in the portion for contact with the second bracket 4a and the outside member 22a become larger than intervals of the ribs 32 in the portion for contact with the second bracket 4 and the outside member 22.

Herein, with the second bracket 4 and the outside member 22 brought into a contact with the stopper 30 according to the first comparative example, the relation between a reactive force of the stopper 30 against the movement amount of the outside member 22 relative to the inside member 21 is set to be the same as that depicted by a solid line in FIG. 4 (first embodiment). Then, with the stopper 30 diverted to the second bracket 4a and the outside member 22a, the one-dot chain line shows the relation between the relative movement amount and the reactive force of the stopper 30. In this way, diverting the stopper 30 to the second bracket 4 and the outside member 22 each having a different internal diameter and a different external diameter changes the intervals of the ribs 32 for contact therewith. This change also changes a deformation amount of the stopper 30 against the relative movement amount, to thereby also change the reactive force of the stopper 30. Thus, a trouble that the characteristic of the stopper 30 at the time of being diverted may change will arise.

Contrary to this, according to the first embodiment shown in FIG. 5A, as stated above, even diverting the stopper 10 to the second bracket 4 and the outside member 22 each having a different internal diameter and a different external diameter prevents any change in the intervals of each of the surface ribs 16 and rear surface ribs 17 for contact therewith. This can suppress the change of the reactive force of the stopper 10 against the relative movement amount. As a result thereof, the change of the characteristic of the stopper 10 at the time of being diverted can be suppressed.

Figure 6A:
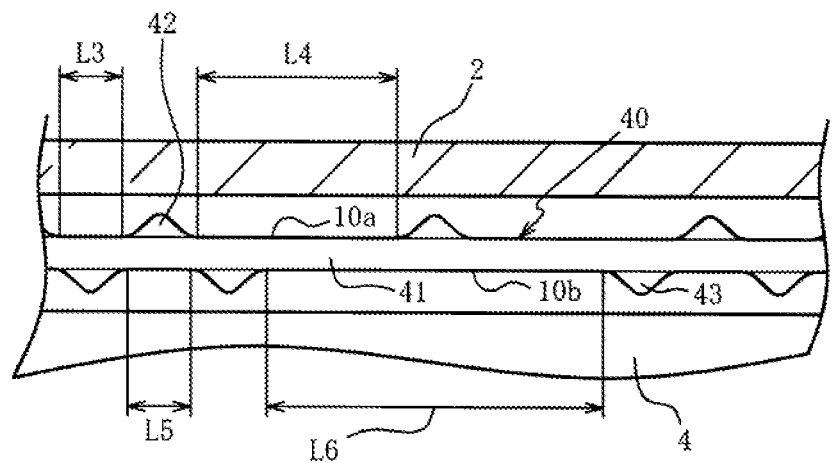
FIG. 6A is an explanatory drawing showing a stopper, according to a second comparative example.
Figure 6B:
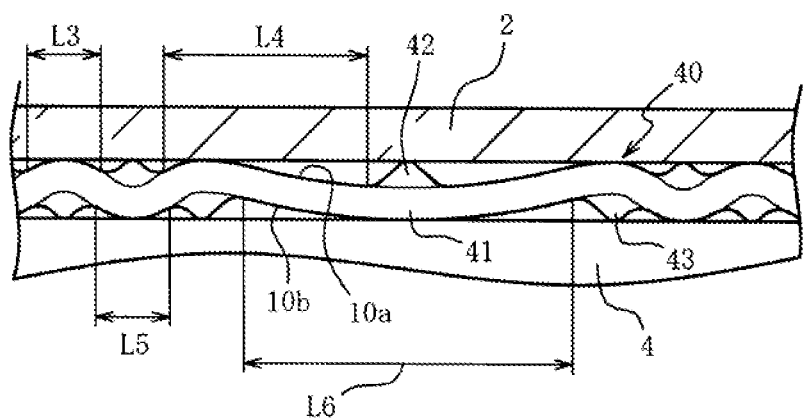
FIG. 6B is an explanatory drawing showing an elastic deformation of the stopper, according to the second comparative example.

Then, referring to FIG. 6A and FIG. 6B, a description will be made about a stopper 40 having adjacent rear surface ribs 43 with different intervals, according to a second comparative example. FIG. 6A is an explanatory drawing showing the stopper 40, according to the second comparative example. FIG. 6B is an explanatory drawing showing an elastic deformation of the stopper 40, according to the second comparative example.

As shown in FIG. 6A, a regulating portion 41 of the stopper 40 according to the second comparative example has a structure in which a surface rib 42 protrudes from the surface 10a and a rear surface rib 43 protrudes from the rear surface 10b. Intervals of the adjacent surface ribs 42 include an interval L3 and an interval L4 larger than the interval L3. Intervals of the adjacent rear surface ribs 43 include an interval L5 and an interval L6 larger than the interval L5. Further the interval L3 and the interval L5 are the same in dimension.

As shown in FIG. 6B, the stopper 40 is brought into a state of being sandwiched by the first bracket 2 and the second bracket 4 (and the outside member 22), to thereby deform, in a relatively gentle manner, the regulating portion 61 in the intervals L4, L6. Relative to a deformation amount of the regulating portion 61 in the intervals L3, L5, the deformation amount of the regulating portion 61 in the intervals L4, L6 larger than the intervals L3, L5 are small. Thus, according to the positions, of the stopper 40, for contact with the first bracket 2, the second bracket 4 and the outside member 22 and according to a load applied to the stopper 40, there is a possibility that a reactive force of the stopper 40 against the relative movement amount between the inside member 21 and the outside member 22 may change. Further, the regulating portion 61 may partially cause a large deformation to thereby concentrate strains, thus making it easy to decrease the endurance of the stopper 40.

Contrary to this, each interval of the adjacent surface ribs 16 and each interval of the rear surface ribs 17 are all set to be the same, according to the first embodiment. Thus, the first embodiment can uniformly deform the regulating portion 12 between the surface ribs 16 and between the rear surface ribs 17. Even when the diverting of the stopper 10 changes the positions of the stopper 10 for contact with the first bracket 2, the second bracket 4 and the outside member 22, and changes the manner of applying the load to the stopper 10, the uniform deforming of the regulating portion 12 can suppress any characteristic change of the stopper 10 at the time of being diverted, and improve the endurance of the stopper 10.

Figure 7A:
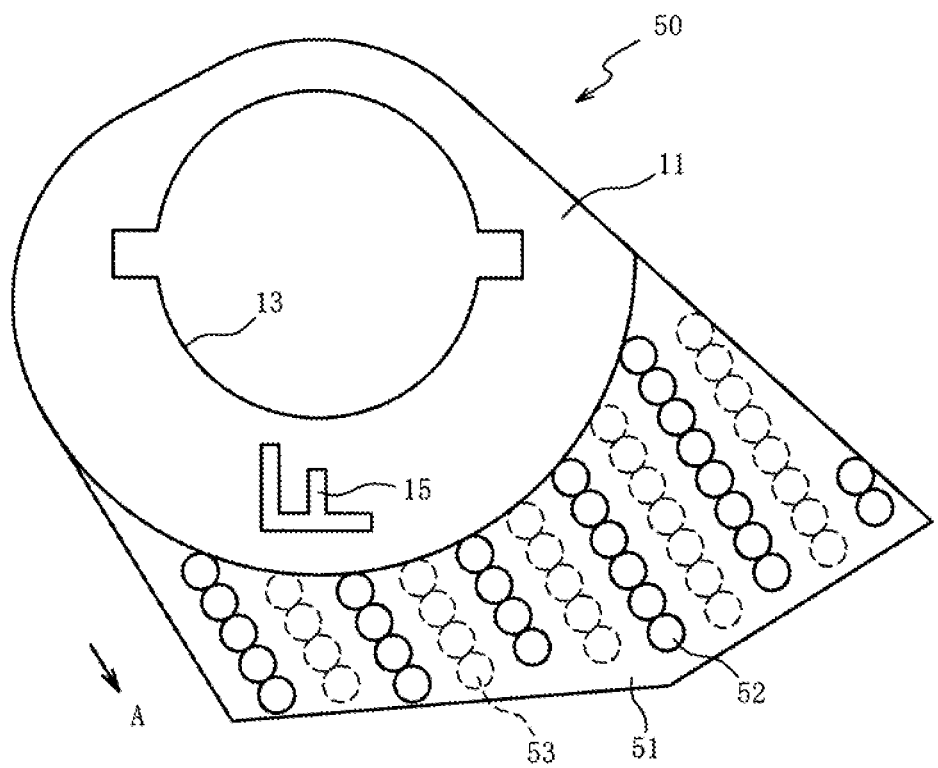
FIG. 7A is a plan view of a stopper, according to a second embodiment.

Then, referring to FIG. 7A, a description will be made about a second embodiment. According to the first embodiment, the description has been made about the case in which the surface rib 16 continues in the extending direction A. Contrary to this, a description will be made about a case in which a surface rib 52 and a rear surface rib 53 are intermittently provided in the extending direction A, according to the second embodiment. Further, portions same as those according to the first embodiment will be added by the same signs and a description thereabout will be omitted hereinafter. FIG. 7A is a plan view of a stopper 50 according to the second embodiment. Further, with a broken line, FIG. 7A shows the rear surface rib 53 provided on the rear surface 10b.

As shown in FIG. 7A, the stopper 50 is a plate-like member for regulating the outside member 22 which axially moves relative to the inside member 21 of the antivibration device 20 (for each members, refer to FIG. 2). The stopper 50 includes a rubber-like elastic body. The stopper 50 has the surface 10a and the rear surface 10b which are formed in a substantially symmetrical manner. The stopper 50 includes the annular mounting portion 11 and a regulating portion 51. The regulating portion 51 is connected to the mounting portion 11.

The regulating portion 51 is a plate-like region provided in a manner to extend from a part of the annular mounting portion 11 in the extending direction A. The extending direction A is a radial direction. The regulating portion 51 includes a plurality of surface ribs 52 and a plurality of rear surface ribs 53. The surface rib 52 protrudes from the surface 10a. The rear surface rib 53 protrudes from the rear surface 10b.

The surface ribs 52 and the rear surface ribs 53 are each a region disposed linearly toward the extending direction A. The surface ribs 52 and the rear surface ribs 53 are intermittently provided in such a manner that each portion semispherically protruding is arranged throughout an entire length. With smooth curved faces, the surface ribs 52 and the rear surface ribs 53 are continuous with the surface 10a and the rear surface 10b respectively.

A plurality of surface ribs 52 and a plurality of rear surface ribs 53 are alternately disposed on the surface 10a and rear surface 10b of the stopper 50. Then, with the regulating portion 51 sandwiched by the first bracket 2 and a combination of the second bracket 4 with the outside member 22, when the outside member 22 further moves relative to the inside member 21, the alternate disposing can, in a stepwise manner, enlarge a reactive force of the stopper 50 against the relative movement amount.

A plurality of surface ribs 52 and a plurality of rear surface ribs 53 are disposed in parallel with each other. That is, the intervals of the surface ribs 52 adjacent to each other, the intervals of the rear surface ribs 53 adjacent to each other are respectively set to be constant throughout the entire length of the regulating portion 51 in the extending direction A. Thus, like the first embodiment, even diverting the stopper 50 to the second bracket 4 and the outside member 22 each having a different internal diameter and a different external diameter prevents any change in the intervals of each of the surface ribs 52 and rear surface ribs 53 for contact therewith. As a result thereof, the change of the reactive force of the stopper 50 against the relative movement amount can be suppressed, thus making it possible to suppress the change of the characteristic of the stopper 50 at the time of being diverted.

The surface ribs 52 and rear surface ribs 53 contacting the first bracket 2, the second bracket 4 and outside member 22 are intermittently provided throughout the entire length. Thus, compared with the case of being continuous throughout the entire length, the surface rib 52 and the rear surface rib 53 can be made easy to elastically deform. In this way, changing the configuration of each of the surface rib 52 and the rear surface rib 53 can appropriately adjust the scale of the reactive force of the stopper 50 against the relative movement amount.

Figure 7B:
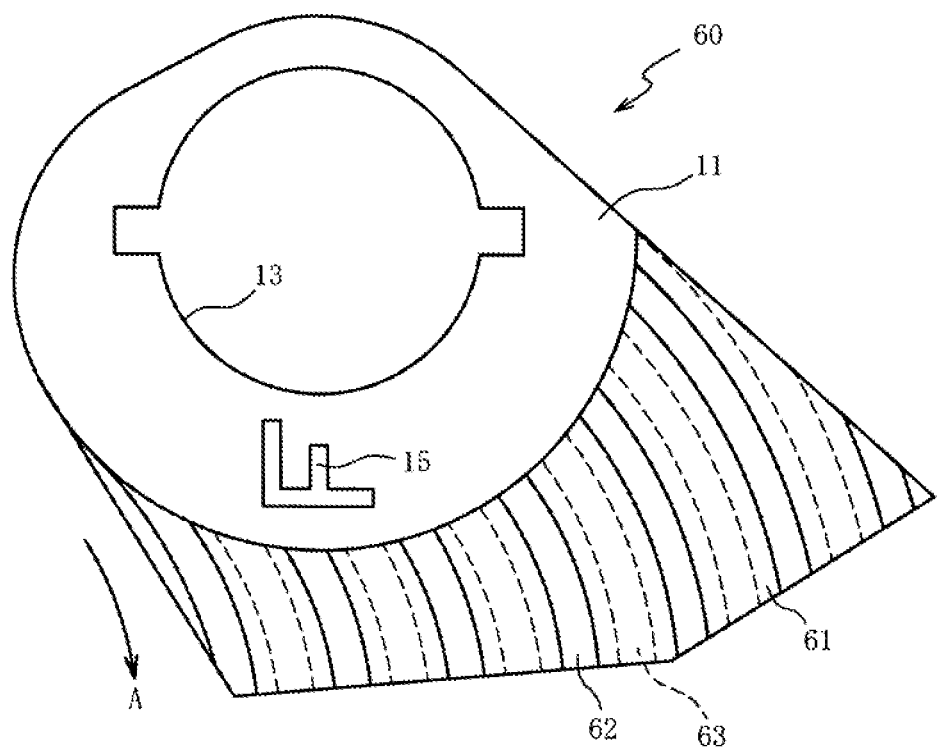
FIG. 7B is a plan view of a stopper, according to a third embodiment.

Then, referring to FIG. 7B, a description will be made about a third embodiment. According to the first embodiment, the description has been made about the case in which the surface ribs 16 are linearly disposed toward the extending direction A. Contrary to this, a description will be made about a case in which a surface rib 62 and a rear surface rib 63 are each curvedly disposed toward the extending direction A, according to the third embodiment. Further, portions same as those according to the first embodiment will be added by the same signs and a description thereabout will be omitted hereinafter. FIG. 7B is a plan view of a stopper 60 according to the third embodiment. Further, with a broken line, FIG. 7B shows the rear surface rib 63 provided on the rear surface 10b.

As shown in FIG. 7B, the stopper 60 is a plate-like member for regulating the outside member 22 which axially moves relative to the inside member 21 of the antivibration device 20 (for each members, refer to FIG. 2). The stopper 60 includes a rubber-like elastic body. The stopper 60 has the surface 10a and the rear surface 10b which are formed in a substantially symmetrical manner. The stopper 60 includes the annular mounting portion 11 and a regulating portion 61. The regulating portion 61 is connected to the mounting portion 11.

The regulating portion 61 is a plate-like region provided in a manner to extend from a part of the annular mounting portion 11 in the radial extending direction. The regulating portion 61 includes a plurality of surface ribs 62 and a plurality of rear surface ribs 63. The surface rib 62 protrudes from the surface 10a. The rear surface rib 63 protrudes from the rear surface 10b.

The surface rib 62 and the rear surface rib 63 are each a region disposed curvedly toward the curved extending direction A. The surface rib 62 and the rear surface rib 63 each are continuous throughout an entire length thereof. A plurality of surface ribs 62 and a plurality of rear surface ribs 63 are alternately disposed on the surface 10a and rear surface 10b of the stopper 60. Then, with the regulating portion 61 sandwiched by the first bracket 2 and a combination of the second bracket 4 with the outside member 22, when the outside member 22 further moves relative to the inside member 21, the alternate disposing can, in a stepwise manner, enlarge a reactive force of the stopper 60 against the relative movement amount.

The intervals of the surface ribs 62 adjacent to each other, the intervals of the rear surface ribs 63 adjacent to each other are respectively set to be constant throughout the entire length of the regulating portion 61 in the extending direction A. Thus, like the first embodiment, even diverting the stopper 60 to the second bracket 4 and the outside member 22 each having a different internal diameter and a different external diameter prevents any change in the intervals of each of the surface ribs 52 and rear surface ribs 53 for contact therewith. Thus, the change of the reactive force of the stopper 60 against the relative movement amount can be suppressed, thus making it possible to suppress the change of the characteristic of the stopper 60 at the time of being diverted.

The surface rib 62 and the rear surface rib 63 are curvedly disposed. When, for example, a partial configuration of each of the first bracket 2 and the second bracket 4 is curved, an area of the surface rib 62 and an area of the rear surface rib 63 for contact with the first bracket 2 and the second bracket 4 can be secured. In this way, in accordance with the configuration of each of the first bracket 2 and the second bracket 4, the surface rib 62 and the rear surface rib 63 are disposed. This disposing can adjust the way of the elastic deforming of the regulating portion 61, thus making it possible to appropriately adjust the scale of the reactive force of the stopper 60 against the relative movement amount between the inside member 21 and the outside member 22.

Figure 8:
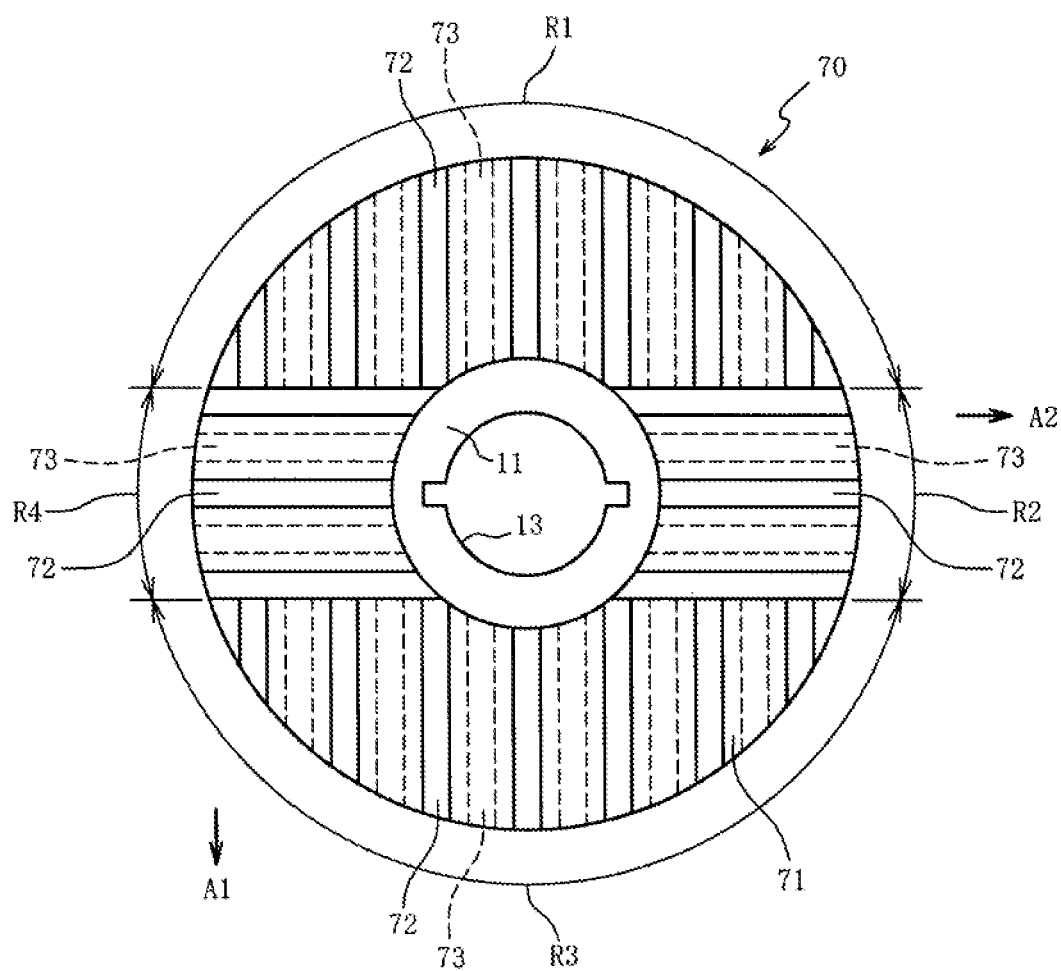
FIG. 8 is a plan view of a stopper, according to a fourth embodiment.

Then, referring to FIG. 8, a description will be made about a fourth embodiment. According to the first embodiment, the description has been made about the case in which, in the entire area in the circumferential direction of the mounting hole 13, a plurality of surface ribs 16 and a plurality of rear surface ribs 17 are linearly disposed toward the same extending direction A. Contrary to this, according to the fourth embodiment, a description will be made about a case in which, in each of regions R1, R2, R3, R4 in the circumferential direction of the mounting hole 13, a plurality of surface ribs 72 and a plurality of rear surface ribs 73 are linearly disposed toward extending directions A1, A2 different from each other. Further, portions same as those according to the first embodiment will be added by the same signs and a description thereabout will be omitted hereinafter. FIG. 8 is a plan view of a stopper 70 according to the fourth embodiment. Further, with a broken line, FIG. 8 shows the rear surface rib 73 provided on the rear surface 10b.

As shown in FIG. 8, the stopper 70 is a plate-like member for regulating the outside member 22 which axially moves relative to the inside member 21 of the antivibration device 20 (for each members, refer to FIG. 2). The stopper 70 includes a rubber-like elastic body. The stopper 70 has the surface 10a and the rear surface 10b which are formed in a substantially symmetrical manner. The stopper 70 includes the annular mounting portion 11 and a regulating portion 71. The regulating portion 71 is connected to the mounting portion 11.

The regulating portion 71 is an annular plate-like region provided in a manner to extend in the radial direction from the entire circumference of the annular mounting portion 11. The regulating portion 71 includes a plurality of surface ribs 72 and a plurality of rear surface ribs 73. The surface rib 72 protrudes from the surface 10a. The rear surface rib 73 protrudes from the rear surface 10b.

The regulating portion 71 is sectioned into four in the circumferential direction of the mounting hole 13. The sectioned portions of the regulating portion 71 are respectively defined as regions R1, R2, R3, R4 in the clockwise direction from the portion on the upper side of the paper plane in FIG. 8. In the regions R1, R3, a plurality of surface ribs 72 and a plurality of rear surface ribs 73 are linearly disposed toward an extending direction A1. In the regions R2, R4, a plurality of surface ribs 72 and a plurality of rear surface ribs 73 are linearly disposed toward an extending direction A2 orthogonal to the extending direction A1.

On the surface 10a and rear surface 10b of the stopper 70, a plurality of surface ribs 72 and a plurality of rear surface ribs 73 are disposed in an alternate manner. Then, with the regulating portion 71 sandwiched by the first bracket 2 and a combination of the second bracket 4 with the outside member 22, when the outside member 22 further moves relative to the inside member 21, the above alternate disposing can, in a stepwise manner, enlarge a reactive force of the stopper 70 against the relative movement amount.

In each of the regions R1, R2, R3, R4, a plurality of surface ribs 72 and a plurality of rear surface rib 73 are disposed in parallel with each other. That is, in the regions R1, R3, the intervals of the adjacent surface ribs 72 and the intervals of the adjacent rear surface ribs 73 are respectively set to be constant throughout the entire length of the regulating portion 71 in the extending direction A1. Further, in the regions R2, R4, the intervals of the adjacent surface ribs 72 and the intervals of the adjacent rear surface ribs 73 are respectively set to be constant throughout the entire length of the regulating portion 71 in the extending direction A2.

As a result of these, like the first embodiment, even diverting the stopper 70 to the second bracket 4 and the outside member 22 each having a different external diameter and a different internal diameter prevents, in each of the regions R1, R2, R3, R4, any change in the intervals of each of the surface ribs 72 and rear surface ribs 73 for contact therewith. As a result thereof, in each of the regions R1, R2, R3, R4, the change of the reactive force of the stopper 70 against the relative movement amount can be suppressed, thus making it possible to suppress the characteristic change of the stopper 70 at the time of being diverted.

In each of the regions R1, R2, R3, R4, each interval of the adjacent surface ribs 72 and each interval of the adjacent rear surface ribs 73 are all respectively set to be the same. Further, in the region R1, the region R2, the region R3 and the region R4, the intervals of the adjacent surface ribs 72 and the intervals of the adjacent rear surface ribs 73 are equal. As a result of these, like the first embodiment, the regulating portion 71 between the surface ribs 72 and between the rear surface ribs 73 can be deformed in a uniform manner, thus making it possible to further suppress the characteristic change of the stopper 70 at the time of being diverted and to improve the endurance of the stopper 70.

Although the present invention has been described based on the embodiments, the present invention is not limited to each of the above embodiments. Therefore, it can be easily conceivable that various improvements and/or modifications will occur to the present invention within a range not beyond the effect of the present invention. For example, the configurations of the mounting portion 11, the regulating portions 12, 51, 61, 71, the surface ribs 16, 52, 62, 72, the rear surface ribs 17, 53, 63, 73, the inside member 21, the outside member 22, the antivibration base body 23, etc. are each one example, and various configurations, as a matter of course, can be adopted. For example, the inside member 21 can be in a form of a shaft such as column, etc.

According to the first embodiment, the description has been made about the case in which even diverting the stopper 10 to the one with the second bracket 4 and the outside member 22 each having a different internal diameter and a different external diameter prevents any change in the intervals of each of the surface ribs 16 and rear surface ribs 17 for contact therewith. The present invention is, however, not necessarily limited to this. Even in the following three cases, the intervals of the adjacent surface ribs 16 and the intervals of the adjacent rear surface ribs 17 are respectively set to be constant throughout the entire length of the regulating portion 12 in the extending direction A, thus preventing any change in the intervals of each of the surface ribs 16 and of the rear surface ribs 17 for contact therewith. In the first case, the stopper 10 is diverted to one with only a different external diameter of the second bracket 4. In the second case, the stopper 10 is diverted to one with only a different internal diameter of the outside member 22. In the third case, the stopper 10 is diverted to one with a different configuration of each of the first bracket 2 and the second bracket 4 to thereby change the position for their contact with the surface rib 16 and the rear surface rib 17.

According to each of the above embodiments, the description has been made about the case in which the surface ribs 16, 52, 62, 72 and the rear surface ribs 17, 53, 63, 73 are linearly disposed in the extending directions A, A1, A2 in which the regulating portions 12, 51, 61, 71 extend from the mounting portion 11. The present invention is, however, not necessarily limited to this. The extending directions A, A1, A2 may be set in a manner to be directions in which the surface ribs 16, 52, 62, 72 and the rear surface ribs 17, 53, 63, 73 extend and may be set irrespective of the mounting portion 11 and the regulating portions 12, 51, 61, 71. For example, the extending direction A may be a direction orthogonal to the direction in which the regulating portions 12, 51, 61 extend from a part of the mounting portion 11, or the circumferential direction of the mounting portion 11 may be the extending directions A, A1, A2.

According to the fourth embodiment, the description has been made about the case in which, in the region R1 and the region R3, a plurality of surface ribs 72 and a plurality of rear surface ribs 73 are linearly disposed toward the same extending direction A1. The present invention is, however, not necessarily limited to this. As a matter of course, a plurality of surface ribs 72 and a plurality of rear surface ribs 73 may be linearly disposed toward any extending directions which are different between in the region R1 and in the region R3. Further, a plurality of surface ribs 72 and a plurality of rear surface ribs 73 may be linearly disposed toward any extending directions which are different between in the region R2 and in the region R4.

According to the fourth embodiment, the description has been made about the case in which the intervals of the adjacent surface ribs 72 and the intervals of the adjacent rear surface ribs 73 are the same in the region R1, the region R2, the region R3 and the region R4. The present invention is, however, not necessarily limited to this. As a matter of course, the intervals of the adjacent surface ribs 72 and the intervals of the adjacent rear surface ribs 73 may be respectively differentiated or may be partly differentiated in the region R1, the region R2, the region R3 and the region R4.

According to the fourth embodiment, the regulating portion 71 is sectioned into four regions R1, R2, R3, R4 in the circumferential direction of the mounting hole 13. The present invention is, however, not necessarily limited to this. As a matter of course, the regulating portion 71 can be sectioned into an arbitrary number (three or less, or five or over) of sections in the circumferential direction of the mounting hole 13. Further, the circumferential length of each of the sectioned regions can be appropriately set.

According to the first embodiment, the description has been made about the case in which the widths of the surface ribs 16 and the widths of the rear surface ribs 17 are all set to be the same. The present invention is, however, not necessarily limited to this. As a matter of course, the width of the surface rib 16 and the width of the rear surface rib 17 can be differentiated. Further, respective widths of a plurality of surface ribs 16 may be differentiated and respective widths of a plurality of rear surface ribs 17 may be differentiated. As a result of these, the scale of the reactive force of the stopper 10 against the relative movement amount between the inside member 21 and the outside member 22 can be appropriately adjusted.

According to the first embodiment, the description has been made about the case in which the height of the surface rib 16 and the height of the rear surface rib 17 are all set to be the same. The present invention is, however, not necessarily limited to this. As a matter of course, the height of the surface rib 16 can be differentiated from the height of the rear surface rib 17. Further, it is possible to differentiate respective heights of a plurality of surface ribs 16 and respective heights of a plurality of rear surface ribs 17. As a result of these, the scale of the reactive force of the stopper 10 against the relative movement amount between the inside member 21 and the outside member 22 can be appropriately adjusted.

According to the first embodiment, the description has been made about the case in which the axial end portion of the second bracket 4 is consistent with the axial end portion of the outside member 22. The present invention is, however, not necessarily limited to this. As a matter of course, the axial end portion of the second bracket 4 can be deviated from the axial end portion of the outside member 22. In this case, any one of the second bracket 4 and the outside member 22 contacts the stopper 10.

According to each of the above embodiments, the description has been made about the case in which the surface ribs 16, 52, 62, 72 and the rear surface ribs 17, 53, 63, 73 are provided in the regulating portions 12, 51, 61, 71 only. The present invention is, however, not necessarily limited to this. As a matter of course, being extended, the surface ribs 16, 52, 62, 72 and the rear surface ribs 17, 53, 63, 73 can be also provided in the mounting portion 11.

Further, any part of or the entirety of each of the above embodiments can be combined with any part of or the entirety of another embodiment. Further, any partial structure of each of the above embodiments can be omitted. For example, as a matter of course, in place of the surface rib 72 and the rear surface rib 73 according to the fourth embodiment, the surface ribs 52, 62 and rear surface ribs 53, 63 according to the respective second and third embodiments can be provided in the regulating portion 71. Further, the regulating portions 12, 51, 61 according to the respective first, second and third embodiments each can be made into an annular plate like the regulating portion 71 according to the fourth embodiment.

The invention claimed is:

1. A antivibration unit in which a stopper is mounted to an antivibration device adapted to connect a first bracket with a second bracket, the antivibration device including:
  an axial inside member having an axial end portion fixed to the first bracket,
  a cylindrical outside member disposed on an external peripheral side of the inside member and having an external peripheral face fixed to the second bracket, and
  an antivibration base body connected to the external peripheral face of the inside member and to an internal peripheral face of the outside member and including a rubber-like elastic body, the stopper including:
  a stopper in a form of a plate and mounted to the antivibration device, the stopper being adapted to regulate a movement of the outside member relative to the inside member and including a rubber-like elastic body, the stopper comprising:
    a mounting hole passing through from a surface to a rear surface and into which the inside member is inserted; and
    a plurality of surface ribs and a plurality of rear surface ribs disposed between the first bracket and at least one of the second bracket or the outside member, wherein
  the plurality of the surface ribs respectively protrude from the surface and are linearly disposed,
  the plurality of the rear surface ribs, on the rear surface, respectively protrude from between the surface ribs and are linearly disposed, and
  in a predetermined region in a circumferential direction of the mounting hole, intervals between the surface ribs adjacent to each other and intervals between the rear surface ribs adjacent to each other are set to be constant throughout an entire length in an extending direction in which the surface ribs and the rear surface ribs extend;

wherein
  in a non-load state of the antivibration device, the stopper is free from a contact with at least one of the first bracket and the second bracket and the outside member.

2. The antivibration unit according to claim 1, wherein, in the predetermined region in the circumferential direction of the mounting hole, all of each of the intervals between the surface ribs adjacent to each other and each of the intervals between the rear surface ribs adjacent to each other are set to be the same.

3. The antivibration unit according to claim 1, wherein at least one of the plurality of the surface ribs and the plurality of the rear surface ribs are continuously provided linearly throughout the entire length in the extending direction respectively.

4. The antivibration unit according to claim 1, wherein at least one of the plurality of the surface ribs and the plurality of the rear surface ribs are intermittently provided linearly throughout the entire length in the extending direction respectively.

5. The antivibration unit according to claim 1, wherein the plurality of the surface ribs and the plurality of the rear surface ribs are curvedly provided throughout the entire length in the extending direction respectively.

6. The antivibration unit of claim 1, wherein
  in said non-load state of the antivibration device, all of said plurality of the surface ribs are free from a contact with any of the first bracket and the second bracket and the outside member.

7. The antivibration unit of claim 1, wherein
  in said non-load state of the antivibration device, all of said plurality of the rear surface ribs are free from a contact with any of the first bracket and the second bracket and the outside member.

8. The antivibration unit of claim 1, wherein
  in said non-load state of the antivibration device, all of said plurality of the surface ribs and all of said plurality of the rear surface ribs are free from a contact with any of the first bracket and the second bracket and the outside member.

9. The antivibration unit of claim 1, wherein said surface ribs extend in like directions to one another along their lengths, and said rear surface ribs extend in like directions to one another along their lengths.

10. The antivibration unit of claim 1, wherein said surface ribs are substantially parallel to one another along their lengths, and said rear surface ribs are substantially parallel to one another along their lengths.

* * * * *